US008774059B2

(12) United States Patent
Muller et al.

(10) Patent No.: US 8,774,059 B2
(45) Date of Patent: Jul. 8, 2014

(54) MULTICASTING APPARATUS

(75) Inventors: Dominique Muller, Daihsen (CH);
Markku Soinio, Espoo (FI)

(73) Assignee: Nokia Corporation, Espoo (FI)

(*) Notice: Subject to any disclaimer, the term of this patent is extended or adjusted under 35 U.S.C. 154(b) by 941 days.

(21) Appl. No.: 10/570,889

(22) PCT Filed: Sep. 16, 2004

(86) PCT No.: PCT/IB2004/051776
§ 371 (c)(1),
(2), (4) Date: Mar. 6, 2006

(87) PCT Pub. No.: WO2005/032044
PCT Pub. Date: Apr. 7, 2005

(65) Prior Publication Data
US 2007/0008910 A1    Jan. 11, 2007

(30) Foreign Application Priority Data

Sep. 25, 2003  (GB) .................................. 0322588.5

(51) Int. Cl.
*H04L 12/16* (2006.01)
(52) U.S. Cl.
USPC ............ 370/260; 370/259; 370/348; 370/379
(58) Field of Classification Search
USPC ......... 370/390, 349, 432, 901, 474, 254, 260, 370/290, 331, 351, 389, 476; 455/432.1, 455/436; 725/39, 45, 46
See application file for complete search history.

(56) References Cited

U.S. PATENT DOCUMENTS

| 6,628,609 | B2* | 9/2003 | Chapman et al. ............. 370/229 |
| 6,798,773 | B2* | 9/2004 | Trossen et al. ............... 370/390 |
| 7,075,904 | B1 | 7/2006 | Manish et al. |
| 2002/0143951 | A1* | 10/2002 | Khan et al. ..................... 709/227 |
| 2002/0184314 | A1* | 12/2002 | Riise ............................ 709/205 |
| 2003/0172165 | A1 | 9/2003 | Xu et al. |
| 2004/0120285 | A1* | 6/2004 | Paila et al. .................... 370/331 |
| 2004/0132448 | A1* | 7/2004 | Torres et al. .................. 455/427 |

(Continued)

FOREIGN PATENT DOCUMENTS

| EP | 0 964 581 A1 | 12/1999 |
| EP | 1 298 836 A1 | 4/2003 |

(Continued)

OTHER PUBLICATIONS

International Search Report of Application No. PCT/IB2004/051776—Completion Date: Jan. 14, 2005.

(Continued)

*Primary Examiner* — Anez Ebrahim
(74) *Attorney, Agent, or Firm* — Locke Lord LLP

(57) ABSTRACT

IP data is multicast from one or more servers (4) in sessions through a network (N) comprising a plurality of routers (R) in a multicast tree to transmission sites (S) of a DVB-T network, where the data is encapsulated by IPEs 28 and transmitted uni-directionally to mobile user equipment (UE). A controller (38) builds up a schedule of session data concerning sessions transmitted by the servers (4) and instructs the IPEs to send join messages to receive data for selected sessions. The join messages may include the address of the source and may be transmitted in good time before the start of the session.

25 Claims, 4 Drawing Sheets

(56) References Cited

U.S. PATENT DOCUMENTS

| | | | |
|---|---|---|---|
| 2004/0213239 A1* | 10/2004 | Lin et al. | 370/395.1 |
| 2004/0258003 A1* | 12/2004 | Kokot et al. | 370/254 |
| 2005/0030932 A1* | 2/2005 | Kelly et al. | 370/345 |
| 2005/0044142 A1* | 2/2005 | Garrec et al. | 709/204 |
| 2005/0091313 A1* | 4/2005 | Zhou et al. | 709/204 |
| 2005/0122963 A1 | 6/2005 | Jeon et al. | |
| 2006/0034313 A1 | 2/2006 | Aaltonen | |
| 2006/0218575 A1* | 9/2006 | Blair | 725/28 |
| 2009/0010255 A1* | 1/2009 | Kim et al. | 370/389 |

FOREIGN PATENT DOCUMENTS

| | | |
|---|---|---|
| JP | 2000-78555 | 3/2000 |
| JP | 2001197108 | 7/2001 |
| JP | 2002199011 | 7/2002 |
| JP | 2004048097 | 2/2004 |
| KR | 2002-81390 | 10/2002 |
| WO | WO0048361 | 8/2000 |
| WO | WO0167675 | 9/2001 |
| WO | WO 01/89154 A1 | 11/2001 |
| WO | WO02098063 | 12/2002 |
| WO | WO 03/024024 A1 | 3/2003 |
| WO | WO03030451 | 4/2003 |

OTHER PUBLICATIONS

Written Opinion of the International Searching Authority dated Jan. 18, 2005.

"Source Specific Multicast", IPSJ Magazine, vol. 43, No. 3, Mar. 2002, pp. 260-265, front and rear cover pages (8 pages).

* cited by examiner

Fig. 1
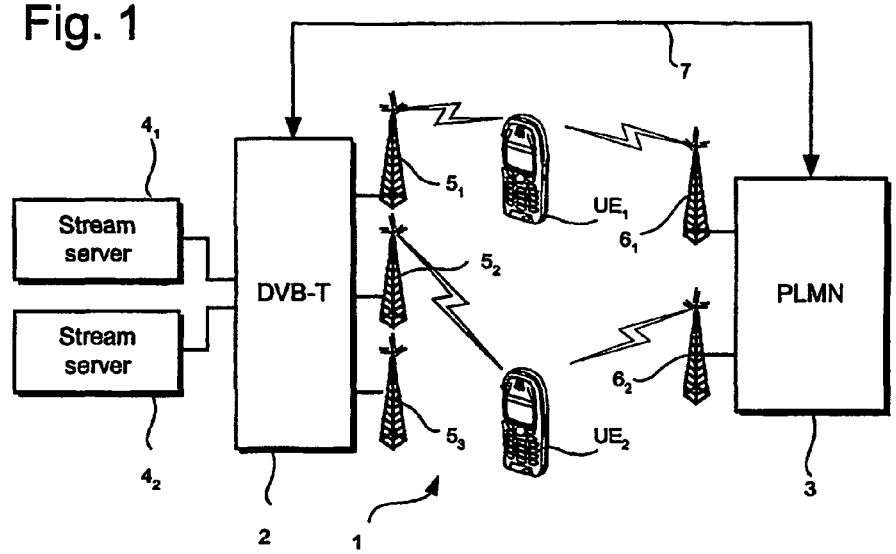
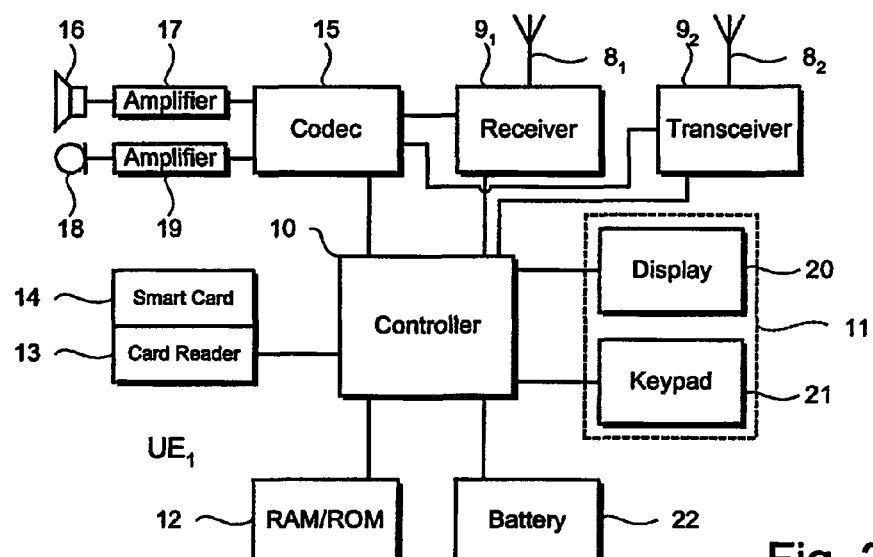
Fig. 2
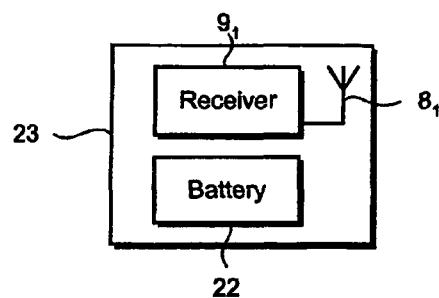
Fig. 3

MULTICASTING APPARATUS

FIELD OF THE INVENTION

This invention relates to multicasting and broadcasting data that may be encapsulated for transmission to a user.

BACKGROUND

Multicasting in bi-directional networks is well known. A single copy of data is sent to those clients who request it through the network. Multiple copies of data are not sent across the network as in unicasting, nor is data sent to clients who do not want it, as in broadcasting, thereby avoiding these disadvantages. Multicasting allows the deployment of multimedia applications on the network while minimizing their demand for bandwidth.

Multicast sessions are announced in advance so that clients know when a multicast is available. The announcements may comprise messages with attributes defined in the well-known internet protocol (IP) Session Description Protocol (SDP) and carried in session announcement protocol (SAP). This supplies clients with all the information they need to receive a multicast session including its name and description, the times it is active, the type of media (audio, video, text etc) and the IP addresses, ports, and protocol it uses. The announcement information is multicast to a well-publicised IP address and port where clients running a session directory tool can receive the information.

To signal that they want to receive a multicast, clients join a group to which the multicast is directed. In Ipv4, the well-known Internet Group Management Protocol (IGMPv2 and IGMPv3) is typically used for joining and leaving a multicast group, whereas in conjunction with Ipv6, the newly introduced Multicast Listener Discovery protocol (MLD and MLDv2) is typically used. Multicast groups provide several advantages. In particular, groups are dynamic so that clients can join or leave at any time, and no elaborate scheme is required to create or disband a group.

When a client joins a multicast group for listening, it initiates two processes: Firstly, a join message is sent to the client's local router in the network to inform the router that the client wants to receive data sent to the group. Secondly, the client sets its IP process to receive the multicast on the group's address and port. Multicast addresses may be Class D IP addresses ranging from 224.0.0.0 to 239.255.255.255 for IPv4 and FF . . . for IPv6. When the client wishes to stop listening to the multicast group, it unsets its IP process to receive data from the multicast group address and port, and sends a leave message to its local router.

The network's routers run protocols to create efficient multicast delivery paths through the network. There are several multicast routing protocols in common use: Distance Vector Multicast Routing Protocol (DVMRP), Multicast Open Shortest Path First Protocol (MOSPF) and Protocol-Independent Multicast (PIM). An efficient delivery path implies that multicast data travels only to those clients who want to receive it and takes the shortest path to those clients. If data travels elsewhere through the network, bandwidth goes to waste needlessly. The delivery paths in the network can be considered as a tree structure and the source of the multicast sends data through the branches of the tree. The routers are responsible for sending data down the correct branches to other routers and then to clients of the group that are waiting for data. Routers prune off branches where no data is wanted for example in response to a leave message received from a client, and also graft branches back to the tree when a new client joins the multicast group.

This approach requires bi-directional communication between the router connected to the client that wishes to join the multicast group, so that the client can send a join message to the network, but in some networks, such as certain wireless networks, the clients are connected to the network over a uni-directional link, which makes conventional IP multicasting impossible unless special steps are taken. One solution is described in our WO 03/024024 which uses a separate multicast tree for control messages which instruct the network for multicasting operations. However, the method described there requires a significant reorganisation of the network functionality i.e. the physical deployment of routers with additional functionality, and requires the tree for control messages to be set up in real time to achieve effective multicasting.

It has been proposed to datacast IP data to mobile clients over a wireless link using terrestrial DVB (DVB-T) communication techniques to provide audio, video and other data formats to mobile receivers. The DVB-T transmission scheme is essentially cellular in nature with a transmission site associated with each cell. DVB-T uses MPEG-2 transport streams and so the IP data needs to be encapsulated into the DVB transmission signals. Data streams comprising IP datagrams supplied from several sources, are encapsulated by an IP encapsulator and fed into the DVB-T network. The encapsulated IP stream is then transported to one or multiple transmission sites, which form cells of the DVB-T network, on an MPEG-2 transport stream for transmission over the air directly to the clients, or to a receiver station serving multiple clients. The MPEG-2 transport stream, from the moment it is produced by the IP encapsulator, to the moment it is received by the client or the receiver station, is unidirectional in nature.

IP packets containing the data are embedded in multi-protocol encapsulation (MPE) sections which are transported within the TS packets. For further details, reference is directed to ETSI EN 301 192 V1.3.1 (2003 January) "Digital Video Broadcasting (DVB) DVB specification for data broadcasting" Section 7. The MPE sections may also include forward error correction (FEC) information and time slicing information, by which data is conveyed discontinuously and allows the receiver to save battery power by switching off when no data is being transmitted to it.

One problem with this arrangement is that the MPEG-2 transport stream is unidirectional and that the DVB-T system does not provide a mechanism allowing the mobile clients to transmit join and leave messages back to the IP encapsulator for use in multicasting the data.

Another problem is that the encapsulated MPE sections produced by the encapsulators at the individual data sources need to be conveyed to the various cellular transmission sites for transmission, which involves the use of expensive DVB multiplexers and other DVB equipment, adding to the cost of the network.

The invention seeks to overcome these problems and disadvantages.

SUMMARY OF THE INVENTION

Broadly stated, the invention provides multicasting apparatus comprising a node for a bi-directional network, the node being operable to transmit join and leave messages for a multicast session to the network, and operable to broadcast session data received in the multicast session from the bidirectional network, unidirectionally. The node may include an encapsulator for encapsulating multicast session data for transmission unidirectionally.

The multicasting apparatus according to the invention may comprise an encapsulator for encapsulating multicast data received in a stream from a remote source through a network to be sent unidirectionally to user equipment, and an encapsulator controller operable to control the encapsulator so as to send a join message to the network for multicasting the stream to the encapsulator from the source through the network.

The encapsulator controller thus instructs the encapsulator to become joined to a multicast group during a certain time interval and send encapsulated data derived from the source to user equipment over a unidirectional path such as a DVB-T system.

Thus, the invention may provide an encapsulator configured as a proxy multicast client for mobile user equipment, operable to receive encapsulated data from the encapsulator multicast to it from a remote server.

The invention also includes method of multicasting comprising operating a node coupled in a bi-directional network, to transmit join and leave messages for a multicast session to the network, and to broadcast session data received in the multicast session from the bi-directional network, unidirectionally.

The invention further includes multicasting apparatus comprising: an encapsulator for encapsulating multicast data received from a remote source through a network to be sent to user equipment, and an encapsulator controller operable to send a join message to the network that includes an address corresponding to the address of the source so that the data can be multicast to the encapsulator from the source through the network.

BRIEF DESCRIPTION OF THE DRAWINGS

In order that the invention may be more fully understood an embodiment thereof will now be described by way of example with reference to the accompanying drawings wherein:

FIG. 1 is a schematic block diagram of a mobile communications system including a DVB-T cellular network and a mobile telecommunications network according to an embodiment of the invention, FIG. 2 is a block diagram of the circuits of a mobile telephone handset configured to receive DVB-T transmissions according to an embodiment of the invention, FIG. 3 illustrates a battery pack for the handset according to an embodiment of the invention.

DETAILED DESCRIPTION

Figure 4:
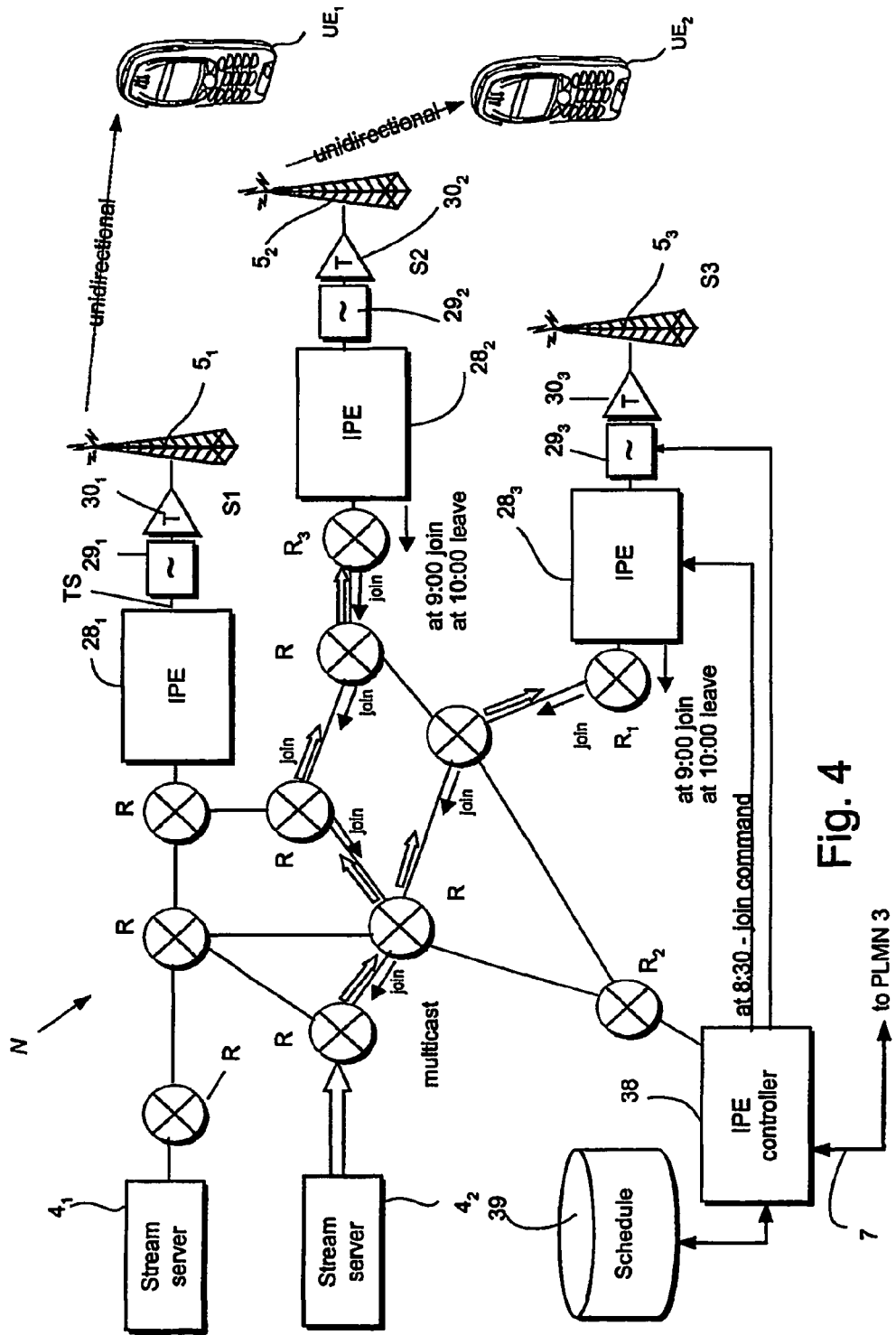
FIG. 4 is a schematic block diagram of the DVB-T network shown in FIG. 1 according to an embodiment of the invention.

FIG. 1 illustrates schematically a communication system in which mobile user equipment in the form of mobile telephone handsets $UE_1$, $UE_2$ are configured to receive transmissions from a DVB-T network 2 and also to communicate through a public land mobile network (PLMN) 3.

The DVB-T network 2 transmits content such as audiovisual content, data files or images to the handsets $UE_1$, $UE_2$. The content is obtained from data stream servers $4_1$, $4_2$ in Internet protocol (IP) so that the network can provide an IP data casting (IPDC) service using the DVB-T network. Two such servers 4 are shown by way of example although in practice there may be many more.

The DVB-T network 2 is cellular and antennae $5_1$, $5_2$ and $5_3$ serve individual cells of the network at geographically spaced sites S1, S2, S3.

The PLMN 3 may comprise any suitable 2G, 2.5G or 3G network with antennae $6_1$ and $6_2$ that serve individual cells of the PLMN. A communication channel 7 may be provided between the DVB-T network and the PLMN 3 to allow bi-directional communication between the networks e.g. for the interchange of service information.

FIG. 2 illustrates the circuits of the mobile handset $UE_1$ by way of example. Handset $UE_2$ is of a similar configuration. The handset includes first and second antennae $8_1$, $8_2$, a receiver $9_1$ and a transceiver $9_2$. The first antenna $8_1$ and receiver $9_1$ are configured to receive signals from the DVB-T network 2.

The second antenna $8_2$ and transceiver $9_2$ are used to transmit and receive signals to and from the PLMN 3. The receiver and transceiver $9_1$, $9_2$ each include respective rf signal processing circuits (not shown) for amplifying and demodulating received signals and respective processors (not shown) for channel de-coding and de-multiplexing.

The handset $UE_1$ also includes a controller 10, a user interface 11, memory 12, a smart card reader 13, smart card 14 received in the smart card reader 13, a decoder/decoder (codec) 15, a speaker 16 with corresponding amplifier 17 and microphone 18 with corresponding preamplifier 19.

The user interface 11 comprises a display 20 and keypad 21. The display 20 is configured to display images and video by, for example, being larger and/or having greater resolution than the display of a conventional mobile telephone handset and being capable of displaying colour images. The device also includes a rechargeable battery 22.

The controller 10 manages operation of the handset under the direction of computer software stored in memory 12. For example, the controller 10 provides an output for the display 20 and receives inputs from the keypad 21.

Referring to FIG. 3, the battery 22, the first antenna $8_1$ and the receiver $9_1$ may be incorporated into a battery pack 23. By replacing the battery pack (not shown in the conventional mobile telephone handset) with a battery pack 23 including the receiver $9_1$ and also by providing suitable software, a conventional mobile telephone handset may be modified to receive data via the DVB-T network 2. Alternatively, the first antenna $8_1$ and the receiver $9_1$ may be incorporated into a cover (not shown) for a conventional mobile telephone handset so that by replacing the cover and necessary software for the handset, the conventional handset can be upgraded to receive transmissions from the DVB-T network 2.

The handset $UE_1$ can receive DVB-T transmissions through receiver $9_1$ from the DVB-T network 2. The received signal is amplified, demodulated, channel de-coded and demultiplexed. The resulting demultiplexed signal (not shown) is filtered so as to extract bursts of datagrams. Datagram bursts are fed into a time slice buffer which is provided by the controller 10 and memory 12 so as to produce a stream of datagrams which are not time sliced. The datagram stream is substantially continuous and/or at the substantially constant rate. The resulting data stream is then displayed on display 20 in respect of video signals and audio signals are passed through codec 15 and amplifier 17 to speaker 16.

The transceiver $9_2$ is for use with PLMN 3 and uses a conventional mobile telecommunications protocol to achieve bi-directional voice and data communication under the control of controller 10, with displays being provided on display 20 and audio being handled by means of speaker 16 and microphone 18.

Whilst the device $UE_1$ has been described in terms of a mobile telephone handset, it may also comprise a personal digital assistant PDA or other mobile terminal capable of at least receiving signals from the DVB-T network 2. The device $UE_1$ may also be semi-fixed or semi-portable such as terminal in a vehicle.

Figure 5:
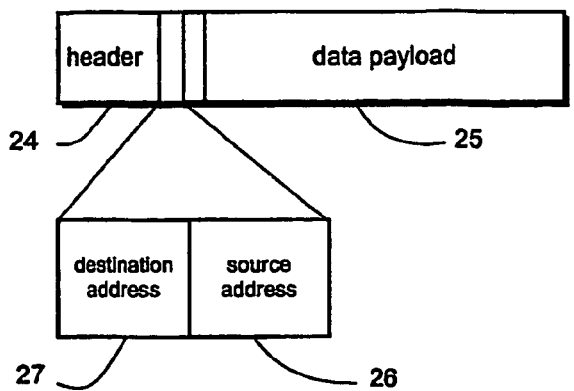
FIG. 5 is schematic illustration of an IP datagram according to an embodiment of the invention.

The DVB-T network 2 is shown in more detail in FIG. 4 according to an embodiment of invention. The stream servers $4_1$, $4_2$ provide streams of data in TCP/IP format as IP datagrams and the general format is illustrated in FIG. 5 schematically. The data streams from the servers $4_1$, $4_2$ may be in different versions and the network can handle all of them. For example, the IP datagrams from one of the servers may be in IPv4 whereas data from another server may be in IPv6. The datagram comprises a header 24 and a payload 25 containing data. The header 24 includes amongst other things an IP address corresponding to the sender, in this case one of the data stream sources 4, together with a destination address 27. As previously explained, the destination address can either comprise an individual address when the datagram is to be sent to a single location i.e. unicast, or the address may comprise a multicast group address, for example a Class D IP address ranging from 224.0.0.0 to 239.255.255.255 for IPv4 or a similar suitable address FF . . . for IPv6.

IP datagrams from the stream servers $4_1$, $4_2$ are produced in sessions according to a pre-arranged time schedule as will be discussed later.

The datagrams from the servers $4_1$, $4_2$ can be multicast through an IP network N that comprises interconnected routers $R_n$ so that the IP datagrams can be sent to the individual transmission sites $5_1$, $5_2$, $5_3$ associated with the antennae $5_1$, $5_2$, $5_3$. It will be understood that the cells associated with each of the DVB antennae are typically of the order of 30 km in radius and so the network N of routers R may be configured over a wide area. Any suitable network can be used, for example, a broadband corporate network or the Internet.

Similar hardware is provided at each of the transmission sites S1, S2, S3. Considering the site S1 by way of example, IP packets received from the network N are fed to an IP encapsulator $28_1$ which performs a multi-protocol encapsulation process so that the IP packets can be included within a MPEG-2 transport stream (TS) used for DVB-T transmissions. In this way, the IP packets received from the network can be included into DVB transmissions, so as to be broadcast to user equipment UE within e.g. the DVB-T cell concerned. The resulting transport stream (S) is fed to a modulator $29_1$ which may comprise a quadrature amplitude modulator that provides a number of logical channels for reception by user equipment within the cell. The output of the modulator $29_1$ is fed to a transmitter $30_1$ connected to antenna $5_1$. Thus, IP data from the servers $4_1$, $4_2$ can be routed to the transmission sites individually and transmitted as IP data over DVB-T to the user equipment. It will be understood that the DVB-T transmission from each of the antennas $5_1$ is unidirectional to the user equipment UE.

Operation of the IPE $28_3$ will now be described by way of example, it being understood that the other IPEs are of similar construction and operation. The IPE comprises a main processor 31 which receives IP datagrams from its most adjacent router $R_1$ in the network from a buffer 32. The main processor 31 runs a number of processes associated with multi-protocol encapsulation of the IP data from buffer 32.

IP encapsulation process 33 run by the processor 31 embeds the IP packets into multi-protocol encapsulation (MPE) sections which are incorporated into MPEG-2 TS packets. For further details, reference is directed to ETSI EN 301 192 V1.3.1 (2003 January) "Digital Video Broadcasting (DVB) DVB specification for data broadcasting" Section 7. Briefly, the IP packets belonging to the same stream, possibly from several IP sessions, are configured for inclusion in the TS stream as an elementary stream (ES). This is achieved by placing the IP datagrams in MPE sections and placing the sections into packets of the TS. As part of the encapsulation process, the IP source and destination addresses may be translated, either from Ipv4 to Ipv6, or from Ipv6 to Ipv. The advantage of translation is that in the air, there will always be Ipv6 addresses in use. The translation from Ipv6 to Ipv gives a means of resolving addressing conflicts in the terminal that may result from the terminal being connected to a different IP network over PLMN and concurrently receiving multicast from there.

The main processor 31 also performs time slicing. As previously explained, time slicing is used in order to reduce the time that the receiver needs to be switched on to receive data thereby saving battery power. The main processor 31 carries out a time slicing process 34 in which the MPE sections are arranged in time spaced bursts in the TS together with time slicing information which indicates when it is safe to turn the receiver off and when to turn it on again, and thereby minimising power consumption in the receiver circuitry. The advantage of implementing timeslicing in the IP encapsulator is that the DVB-T network as such does not need to be changed, i.e. standard commercially available equipment can be used.

Also, a forward error correction process 35 may be carried out in order to create packets of data containing forward error correction codes (FECs) to be incorporated into the TS. The usefulness of implementing FEC in the IP encapsulator lies in the fact that the transmission over the air is particularly error-prone (compared to transmission in wired networks). There are two main reasons for this: the signal-to-noise ratio in radio transmission is not as good as in wire-based transmission media, and can have considerable fluctuations, and due to the uni-directionality, it is not possible to use protocols (like TCP) that can ask for re-transmission of lost packets. Since FEC consumes a considerable amount of bandwidth to be effective (a typical value can be 33% more bandwidth), it is optimal to add FEC just for the transmission in the DVB-T network, i.e. in the IP encapsulator.

The main processor 31 also performs security function processes 36 to allow IP encryption and authentication codes to be processed, such as Ipsec according to Internet Engineering Task Force (IETF) RFC 2401. Such codes can be used to check the integrity of IP datagrams received from the network N in the buffer 32 and can also be included for the encapsulated data in the TS, so that only authorised UEs can receive the data successfully and can be certain about its source. The advantage of securing the IP data in the IP encapsulator lies in the fact that this permits IP sessions from a multitude of sources being secured for transmission over the air in a uniform manner. The problem of key management in a broadcast environment, a very hard problem which hasn't been practically solved in the general case, is thereby reduced to sending the keys used for encryption to the group of authorized clients. The PLMN 3 can be used for this, possibly in conjunction with an e-commerce solution, which sends the keys as a result of a successful purchase transaction initiated by the client.

Also, a bandwidth control process 37 may be used in order to control the quality of service, by controlling the bandwidth allocated to a particular data stream from one of the IP sources 4₁, 4₂ in a particular session. In a broadcast environment, where no data is sent on-demand, IP sessions are scheduled, so that clients can be informed in advance about the streams to be transmitted. For each stream, a certain amount of bandwidth is allocated during its lifetime. The bandwidth control process ensures that each stream gets its allocated bandwidth, by limiting each stream to the allocated bandwidth, thereby protecting them from other streams that send more data than they are supposed to. Furthermore, the streams use layered coding, i.e. multiple IP streams that make up the whole stream, with a different priority attached to each IP stream. If the IP encapsulator has to limit the bandwidth of a particular stream, by dropping some of its IP packets, it can drop the packets from the lowest-priority stream (and then from the next-to-lowest-priority stream, and so forth). Such a layered coding scheme can be implemented for both file-based transmission as well as stream-based transmission (e.g. audio, video). In case of audio and video streams, it can be based on scalable coding.

According to an embodiment of the invention, the data sent through the network from the servers 4₁, 4₂ is multicast to the individual transmission sites S1, S2, S3 in response to join messages transmitted to the network from the individual IPEs 28 at the transmission sites. The timing of transmission of the join messages is controlled in accordance with scheduling information from an IPE controller 38 illustrated as an example in FIG. 4 and also FIG. 6. The controller 38 builds up details of the schedule of sessions to be transmitted by the data stream servers 4₁, 4₂, in a data store 39. The IPE controller 38 and associated store 39 may control operation of all of the IPEs 28₁, 28₂, 28₃ or each may have its own IPE controller.

Figure 6:
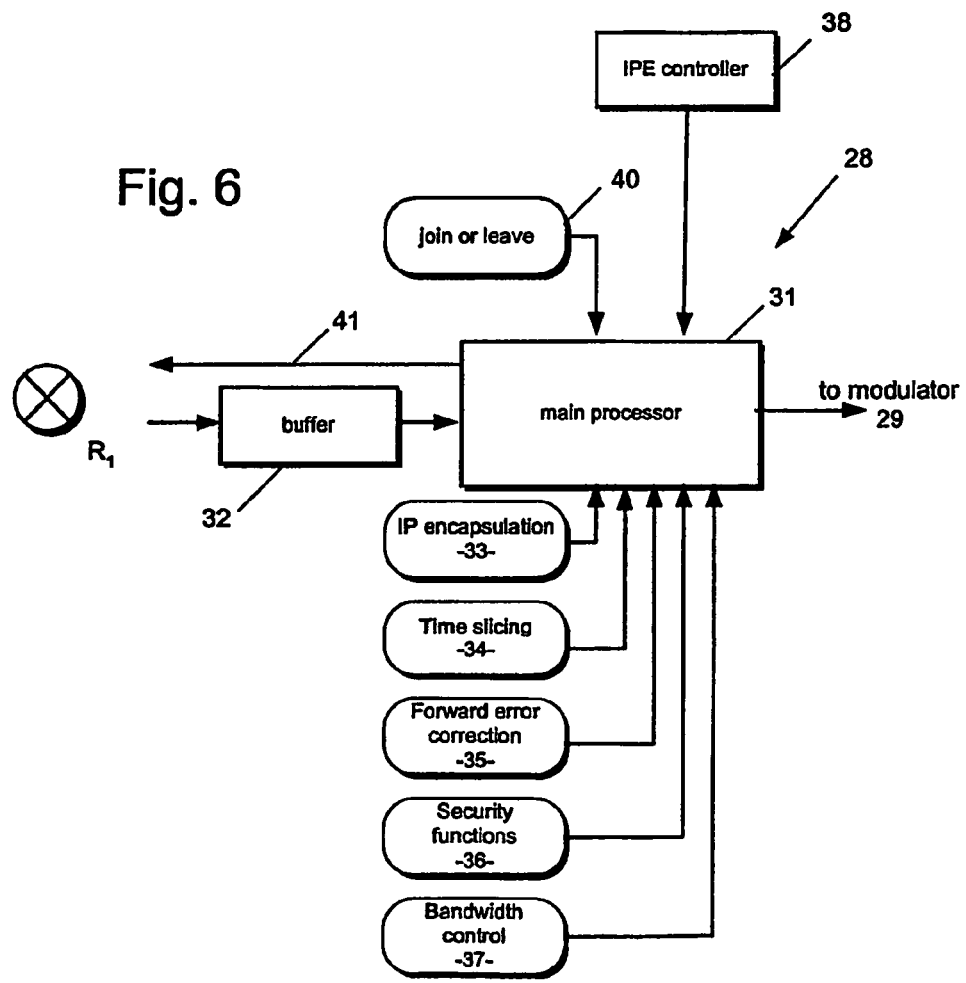
FIG. 6 is a block diagram of one of the IPEs shown in FIG. 4 according to an embodiment of the invention.

Referring to FIG. 6, the IPE controller 38 instructs the main processor 31 of IPE 28₃ to run a join or leave process 40 so that join or leave messages are sent to the router R₁ on path 41. The join and leave messages are configured so that selected IP sessions are directed from the stream servers 4₁, 4₂ to the transmission sites S1-S3 selectively.

This will now be explained in more detail. The IPE controller 38 builds in store 39 a schedule of IP sessions including an IP source address i.e. an address associated with one of the servers 4₁, 4₂, a multicast address associated with the session, a start time and a finish time. An example of one of the sets of data in store 39 is illustrated in Table 1.

TABLE 1

| | Session | | | |
|---|---|---|---|---|
| | 1 | 2 | 3 | N. |
| Session start time (t start) | 09:00 hrs | 12:00 hrs | | |
| Session finish time (t end) | 10:00 hrs | 12:30 hrs | | |
| IP version selector (v4 or v6) (45) | IPv4 | IPv6 | | |
| Source address (43) | xxxx | Pppp | | |
| Multicast destination address (44) | yyyyy | Qqqq | | |

TABLE 1-continued

| | Session | | | |
|---|---|---|---|---|
| | 1 | 2 | 3 | N. |
| Bit rate | N kbs | M kbs | | |
| Translated source address (IPv6) | mmmm | Rrrrr | | |
| Translated destination address (IPv6) | nnnn | Sssss | | |
| Security policy | Authentication; No encryption | Authentication; Encryption | | |
| Authentication key & method | Key Ka1; algorithm AA1 | Key Ka2; algorithm AA2 | | |
| Encryption key & method | none | Key Ke2 Algorithm EE2 | | |
| FEC | yes | No | | |

The IPE controller 38 can build up the session information shown in Table 1 by any suitable means e.g. by acting as a client in the network so as to receive via router R₂ shown in FIG. 4 session scheduling information concerning sessions from the servers 4₁, 4₂ which can be sent in the form of Simple Object Application Protocol (SOAP) messages or any other form. Alternatively, if individual IPE controllers are provided for each transmission site 5₁, 5₂, 5₃, the session scheduling information can be obtained by the controller by accessing the next adjacent router R to the site S concerned.

Figure 7:
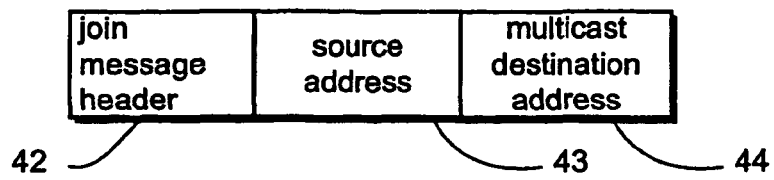
FIG. 7 is schematic illustration of an IP join message according to an embodiment of the invention.

Referring again to the IPE controller 38 shown in FIG. 4, in the event that the controller 38 determines that session 1 of Table 1 is to be multicast to IPE 28₃ at site S3, the controller 38 instructs the main processor 31 to run the join message process 40 in good time before the commencement of the multicast session. The resulting IP join message that is sent to router R₁ is illustrated schematically in FIG. 7 and comprises a header 42, data 43 corresponding to the source address for the server 4 that provides the stream of data for the session—server 4₂ in this example, and data 44 corresponding to the multicast destination address for session 1. As shown in Table 1, session 1 runs from t start=09:00 hrs until t end=10:00 hrs.

Figure 8:
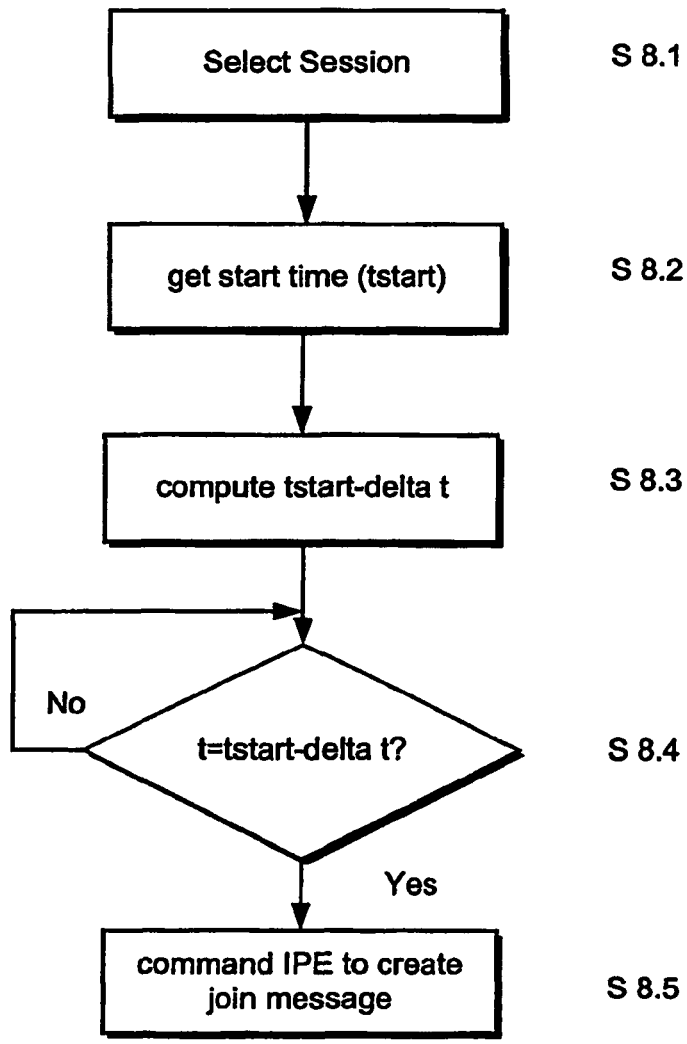
FIG. 8 is a flow diagram of a process performed by an IPE controller according to an embodiment of the invention.

FIG. 8 illustrates how the controller 38 commands the IPE to produce the join message. At step S8.1 data for the appropriate session (session 1) is selected from the store 39 i.e. from the data of Table 1. At step S8.2 the start time t start for the session is fetched i.e. 10:00 hrs. At step S8.3 the IPE controller 38 computes a time (t start−delta t) where delta t is a suitable time e.g. a few minutes, to allow a multicast tree to become set up in the network N e.g. 5-30 minutes. In this example delta t=30 minutes. At step S8.4, the real time is continuously checked until it reaches (t start−delta t) i.e. 08:30 hrs in this example. Then, at step S8.5, the controller 38 commands the IPE 28 to create the join message shown in FIG. 7.

In response to the join command, the IPE 28 produces the join message a few seconds before the start of the session and forwards the join message to the network N. The router R₁ on receiving the join message then negotiates with other routers R in the network to establish a multicast tree for session 1 from the source address corresponding to server 4₂ to the IPEs concerned. In this example, both IPE 28₂ and 28₃ have sent join messages to the network, as illustrated in FIG. 4. Thus, a multicast tree from server 4₂ with branches extending to both IPE 28₂ and 28₃ is set up in good time before commencement of session 1.

The or each controller 38 instructs both IPE 28₂ and IPE 28₃ to send leave messages to their respective next adjacent routers $R_1$, $R_3$ at the end of the session i.e. at 10:00 hrs, in order to cease reception of the session data.

The network routers R may use any convenient multicast routing protocol to establish the multicast tree e.g. SSM, DVMRP, MOSPF and PIM.

An embodiment of the IPE controller 38 shown in FIG. 4 may build up a profile of the types of session that should be conveyed to the individual sites S1-S3 for transmission to the handsets $U_E$. For example, data concerning individual user preferences may be built up as a result of data transmitted through the PLMN from the individual handsets $U_E$ and communicated through link 7 to the IPE controller. These preferences can be cell specific for the DVB-T network.

One advantage of the described system is that since the multicast session source address is included in the join messages from the encapsulator 28, a source specific multicast (SSM) tree can be created, which is much more effective than the process described in WO 03/024024 since it enables the routers R to set up a multicast tree without sending discovery messages throughout the network but only towards the multicast source (source $4_2$ in previously described example). SSM techniques are described in more detail in Internet Engineering Task Force (IETF) RFC 3569.

The join and leave messages sent by the encapsulator 28 to the network N need to be in a format appropriate for the session data to be received from the server 4, which as previously stated, can be either IPv4 or IPv6. The processor 31 checks the version data 45 in Table 1 and generates the join message appropriately. For Ipv4 session data, the joins and leaves are sent as IGMPv2 or IGMPv3 (SSM) messages, whereas for IPv6, the joins and leaves are sent as MLD or MLDv2 (SSM) messages.

When the encapsulator 28 encapsulates the session data into the DVB-T transport stream, the IP packets are always transmitted over the air in IPv6 irrespective of whether the server 4 supplied the packets in Ipv4 or IPv6. The processor 31 of the encapsulator 28 carries out a conversion from IPv4 to IPv6 when required by reference to Table 1 which stores corresponding IPv6 source and destination addresses for IPv4 sessions. Thus, for the example of session 1 shown in Table 1, the IPv4 addresses xxxx and yyyy are replaced by mmmm and nnnn in the data transmitted over the air to the handsets UE.

The addresses transmitted in the TS over the air for IPv6 session data may also translated to different values, as illustrated in Table 1 for session 2, out of an address range used for SSM. This is to avoid any risk of collision with IP data transmitted to the handsets UE through the PLMN 3 which might otherwise use the same addresses.

While there is always one source address for a session, there may be multiple destination addresses. This can be used when a session to be received by a UE is to be more than one IP stream e.g. for multimedia streaming, where there is a stream for the address, several for audio, several for subtitles, and one for synchronisation.

Table 1 also includes data concerning the security policy to be applied to a particular session, in particular, whether encryption and/or authentication is to be performed by the process 36 and if so, which algorithm and keys are to be used.

The stored data in Table 1 also indicates whether FEC process 35 is to be used and the bandwidth (bit rate) to be allocated to the session by process 37.

Another advantage of the encapsulator 28 shown in FIG. 6 is that the security function process 36 can run an encryption algorithm and authentication algorithm with associated keys (IPsec) in respect of the join messages, providing improved security.

A further advantage is that the IPE controller 38 can instruct the bandwidth control process 37 to allocate a predetermined bandwidth to the encapsulated data depending on the data type for a particular session. For example certain video streams for some sessions may be allocated more bandwidth than others to ensure a good quality of service. Furthermore, by limiting the bandwidth that each session consumes to the bandwidth specified in Table 1, the quality of service for the session and concurrent sessions is guaranteed since it is not possible for other bandwidth hungry services to grasp bandwidth unallowably and degrade bandwidth available for the session.

From the foregoing, it will be seen that the IPEs 28 each act as a multicasting proxy client for one or more of the mobile handsets UE, overcoming the problem of the unidirectional over-the-air link that inhibits conventional multicasting from the servers 4 to the handsets.

From the foregoing it will be understood that the invention provides multicasting apparatus for use in multicasting data that is encapsulated for transmission to a user over a unidirectional broadcast network, where the potential senders and the potential receivers form disjunct groups, and where for a given multicast session, there may be exactly one previously known sender.

Many modifications and variations of the described multicasting system will be evident to those skilled in the art. For example, the IPE 28 could process Ethernet packets as well as IP datagrams with suitable preprocessing. Also, the invention is not restricted to DVB-T and other transmission schemes could be used which need not necessarily be wireless.

The invention claimed is:

1. Multicasting apparatus comprising:
an encapsulator for encapsulating multicast data received from a remote source through a bidirectional network, the bidirectional network comprising a plurality of potential remote sources of multicast session data, to be sent, through a unidirectional network to user equipment, and
an encapsulator controller operable to control the encapsulator so as to send a join message through the network for multicasting the data to the encapsulator from the source through the bidirectional network, wherein the join message includes an address corresponding to a single remote source selected from the plurality of potential remote sources, thereby creating a source specific multicast tree, the single remote source being the source of the multicast data, and wherein the encapsulator is operable to receive data from servers in different versions and to send the join message in a format dependent on the data version.

2. Multicasting apparatus according to claim 1 wherein join message is scheduled to be sent at a predetermined time.

3. Multicasting apparatus according to claim 2 wherein the scheduled time is prior to commencement of a session of data from the source.

4. Multicasting apparatus according to claim 1 wherein the join message includes an address corresponding to a multicast group.

5. Multicasting apparatus according to claim 1 wherein the join message is followed by a leave message to cease multicasting the data to the encapsulator.

6. Multicasting apparatus according to claim 1 wherein the controller is operable to determine a schedule of data sessions to be sent to the encapsulator and to instruct the encapsulator to send join and leave messages corresponding to the schedule.

7. Multicasting apparatus according to claim 1 wherein the encapsulator is operable to encapsulate IP packet data into a MPEG transport stream packets.

8. Multicasting apparatus according to claim 1 wherein the encapsulator is operable to encapsulate IP packet data into sections, arrange the sections in bursts and provide time slicing information corresponding to the disposition of the bursts.

9. Multicasting apparatus according to claim 1 wherein the encapsulator is operable to control the bandwidth of the encapsulated data and the encapsulator controller is operable to command the encapsulator to provide a predetermined bandwidth for the encapsulated data.

10. Multicasting apparatus according to claim 1 wherein the encapsulator is operable to perform encryption and authentication processes on the data.

11. Multicasting apparatus according to claim 1 wherein the encapsulator is operable to receive data from servers in different versions and to convert them into a common version for unidirectional transmission to the user equipment.

12. Multicasting apparatus according to claim 1 including the network and said source.

13. Multicasting apparatus according to claim 12 wherein the network includes a plurality of routers operable in response to the join message to establish a multicast tree to for data to pass from the source to the encapsulator.

14. Multicasting apparatus according to claim 12 including a plurality of said encapsulators arranged at respective transmission sites of a wireless network for encapsulating the data for transmission to user equipment.

15. A method of multicasting comprising:
operating an encapsulator to encapsulate multicast data received from a remote source through a bidirectional network, the bidirectional network comprising a plurality of potential remote sources of multicast session data, to be sent through a unidirectional network to user equipment, and
controlling the encapsulator so as to send a join message through the network for multicasting the data to the encapsulator from the source through the network, wherein the join message includes an address corresponding to a single remote source selected from the plurality of potential remote sources, thereby creating a source specific multicast tree, the remote source being the source of the multicast data,
wherein the encapsulator is operable to receive data from servers in different versions and to send the join message in a format dependent on the data version.

16. The method according to claim 15 including scheduling the join message to be sent at a predetermined time prior to commencement of a session of data from the source.

17. The method according to claim 15 including providing the join message with an address data corresponding to a multicast group.

18. The method according to claim 15 including sending a leave message to cease multicasting the data to the encapsulator.

19. The method according to claim 15 including determining a schedule of data sessions to be sent to the encapsulator and to instructing the encapsulator to send join and leave messages corresponding to the schedule.

20. The method according to claim 15 including commanding the encapsulator to provide a predetermined bandwidth for the encapsulated data.

21. The method according to claim 15 including performing encryption and authentication processes on the data.

22. The method according to claim 15 including allocating a predetermined bandwidth to the session, and limiting the transmission so as not to exceed the bandwidth.

23. The method according to claim 22 wherein the data for the session is made up of a plurality of streams with different priorities, and including dropping data from the streams in accordance with their priorities.

24. Multicasting apparatus comprising:
an encapsulator for encapsulating multicast data received in a stream from a single remote source through a bidirectional network comprising a plurality of potential remote sources of multicast session data, to be sent to user equipment, the single remote source being the source of the multicast data, and
an encapsulator controller operable to send a join message through the network that includes an address corresponding to the address of the single remote source selected from the plurality of potential remote sources, thereby creating a source specific multicast tree so that the data can be multicast to the encapsulator from the source through the network,
wherein the encapsulator is operable to receive data from servers in different versions and to send the join message in a format dependent on the data version.

25. An apparatus, comprising: a mobile handset in communication with a multicasting apparatus, wherein the multicasting apparatus comprises: an encapsulator for encapsulating multicast data received from a remote source through a bidirectional network, the bidirectional network comprising a plurality of potential remote sources of multicast session data, to be sent, through a unidirectional network to user equipment, and
an encapsulator controller operable to control the encapsulator so as to send a join message through the network for multicasting the data to the encapsulator from the source through the bidirectional network, wherein the join message includes an address corresponding to a single remote source selected from the plurality of potential remote sources, thereby creating a source specific multicast tree, the single remote source being the source of the multicast data, and wherein the encapsulator is operable to receive data from servers in different versions and to send the join message in a format dependent on the data version.

* * * * *